United States Patent
Pollack

(10) Patent No.: US 6,394,154 B1
(45) Date of Patent: May 28, 2002

(54) TRANSFER PIPE SYSTEM

(75) Inventor: Jack Pollack, Monaco (MC)

(73) Assignee: Single Buoy Moorings Inc., Marly (CH)

( * ) Notice: Subject to any disclaimer, the term of this patent is extended or adjusted under 35 U.S.C. 154(b) by 0 days.

(21) Appl. No.: 09/701,351

(22) PCT Filed: May 31, 1999

(86) PCT No.: PCT/EP99/03818
§ 371 (c)(1),
(2), (4) Date: Feb. 20, 2001

(87) PCT Pub. No.: WO99/67262
PCT Pub. Date: Dec. 9, 1999

(30) Foreign Application Priority Data

May 29, 1998 (EP) .............................................. 98201805
Aug. 24, 1998 (EP) ............................................ 98202824

(51) Int. Cl.[7] .................................................. B65B 1/04
(52) U.S. Cl. ............................ 141/387; 114/230; 441/3
(58) Field of Search ................................ 141/279, 387, 141/388; 114/230, 231; 441/3–5

(56) References Cited

U.S. PATENT DOCUMENTS

| 4,339,002 A | | 7/1982 | Gibbs |
| 4,530,302 A | | 7/1985 | Pedersen |
| 4,907,996 A | * | 3/1990 | Poldervaart |

FOREIGN PATENT DOCUMENTS

| EP | 0 135 445 | 3/1985 |
| FR | 1 327 330 | 8/1963 |
| FR | 2 159 703 | 6/1973 |
| FR | 2 420 475 | 10/1979 |

* cited by examiner

Primary Examiner—Steven O. Douglas
(74) Attorney, Agent, or Firm—Young & Thompson

(57) ABSTRACT

The transfer system includes two generally vertically oriented duct sections which are placed at an angle with the vertical. These two sections are connected to a substantially horizontal third member, for instance a third duct section. Near the connection points of the vertically oriented duct sections and the horizontal member, a tensioning weight is provided such that a tensioning force in the horizontal duct section is created. Hereby bending/kinking and/or buckling due to currents or floating systems dynamics is reduced. A relatively long horizontal duct section can be used which is preferably made of hard pipe, having a reduced swing.

21 Claims, 4 Drawing Sheets

TRANSFER PIPE SYSTEM

FIELD OF THE INVENTION

The invention relates to a transfer system for transfer of fluids from a first floating or fixed structure to a second floating structure, the transfer system comprising a first and second duct section connected to the first and second sores respectively, and a substantially horizontal, submerged, third duct section interconnecting the first and second duct sections.

BACKGROUND OF THE INVENTION

It is known to connect two floating offshore structures via a transfer duct system for conveying hydrocarbons from one structure to the other. One floating structure may be a production or storage structure such as a spar buoy, a semi-submersible structure, a fixed tower or a mooring buoy whereas the second structure may comprise a floating production storage and offloading vessel (FPSO), a shuttle tanker and the like. Such a system is described in Dutch patent application NL-A-8701849. In the known configuration, a production platform is anchored to the seabed via radial taut mooring lines, the platform being connected to a subsea well head via a riser. The production platform is connected to a mooring buoy via flexible duct sections. The duct sections are anchored to the seabed via tethers. The mooring buoy is connected to the seabed via a cable carrying at the end thereof a clump weight. The clump weight is anchored to the seabed via an anchor chain. The mooring buoy can freely drift within an area that is defined, by the length of the anchor chain between the clump weight and the sea bed. The taker that is moored to the buoy can weathervane around the buoy and is subject to drift in accordance with prevailing wind and current conditions.

From U.S. Pat. No. 4,339,002 a discharge manifold system is known wherein a flexible conduit extends vertically downwards from a production platform to below waterlevel, continues horizontally and extends vertically upward towards a mooring buoy which is anchored to the seabed.

The known systems have as a disadvantage that the duct sections may be subjected to bending/kinking or buckling due to currents which may displace the system sideways. In view of the connection of the shuttle tanker to the freely moving mooring buoy, the influence of the floating system dynamics on the transfer ducts, is limited but the system is relatively complex in view of the additional mooring buoy being required. Furthermore, in view of the freedom of movement of the tanker, there is a risk of the tanker damaging the transfer pipes.

An alterative option to connect two floating structures is to run the transfer pipes down to the seabed and back up in order to avoid curt and floating system-induced forces. Such a system however is not practical in deep water, for instance at depths of 1000 meters below sea level or more.

SUMMARY OF THE INVENTION

It is therefore ea object of the present invention to provide a transfer system in which the bending or buckling due to currents and floating system dynamics is reduced and which has a relatively small swing. It is another object of the present invention to provide a transfer system which can bridge a large distance between the interconnected structures. It is a further object of the present invention to provide a transfer system which can be produced in an economic manner.

Hereto the transfer system according to the present invention is characterized in that the horizontal member is near its ends provided with tensioning members oriented in a substantially vertical direction at least one tensioning member being inclined at an angle ($\alpha$) with respect to the vertical, a tensioning weight being connected at or near the ends of the horizontal member for providing a tensioning force on the third duct section.

Because of the inclination of at least one of the vertically positioned tensioning members, the ballast weight exerts a horizontal component on the substantially horizontal third duct section. Hereby it is kept from bending or buckling and has a reduced swing due to the restoring force created by the counterweight when it is offset from its equilibrium position. Furthermore, the system according to the present invention does not require additional mooring constructions and allows to use relatively long, substantially horizontal duct section, having a length of for instance 3000 meters.

With "substantially horizontal" it is meant that the third duct section does not make a larger angle with the horizontal than at most 45°.

According to the invention it is possible to either integrate the tensioning member in either one of the first or second duct sections or embodying the tensioning member as a separate article.

In the first embodiment because of the tension, the related first or second duct section will generally extend according to a straight line. In the second embodiment the first and/or second duct section can have any shape.

This is dependent from its length relative to the length of the tensioning member as well as its weight. For example the related first or second duct section can comprise three parts, one substantial vertical part and other substantial horizontal part connected by a transitional part.

In one embodiment both first and second tensioning members are inclined with respect to the vertical, a tensioning weight being provided at or near each connecting point of the first and second duct sections with the third duct section. By using two tensioning weights, one at each end of the horizontal duct section, an even tension force can be applied on the horizontal duct section.

Preferably the first and second duct sections and/or tensioning members are attached to the third duct section via an articulation joint, such as for instance a flex joint or a pivoting joint. In one embodiment the duct sections are made of hard pipe which allows for a relatively economic manufacture. The use of hard pipe in this case is possible as the bending and buckling in the present system is reduced due to the tensioning effect of the weights. When hard pipe is used, the system of the present invention may be used in relatively large water depths such as 100–150 meters below sea level and deeper. It is possible to use however a combination of hard and flexible duct sections. Multiple transfer systems of the present invention may extend in a radial manner from a single floating structure, such as the spar buoy, to respective FPSO-tankers or buoys for export. The buoyancy of the tensioning weights may be adjustable for instance by ballasting the counter weights wit water or deballasting using compressed air. Additional weight could also be added or removed. The third duct section may be provided with buoyancy such as to have a neutral or even positive buoyancy in water.

BRIEF DESCRIPTION OF THE DRAWINGS

Embodiments of the transfer system according to the present invention will, by way of example, be described in detail with reference to the accompanying drawings. In the drawings.

DETAILED DESCRIPTION OF THE INVENTION

Figure 1:
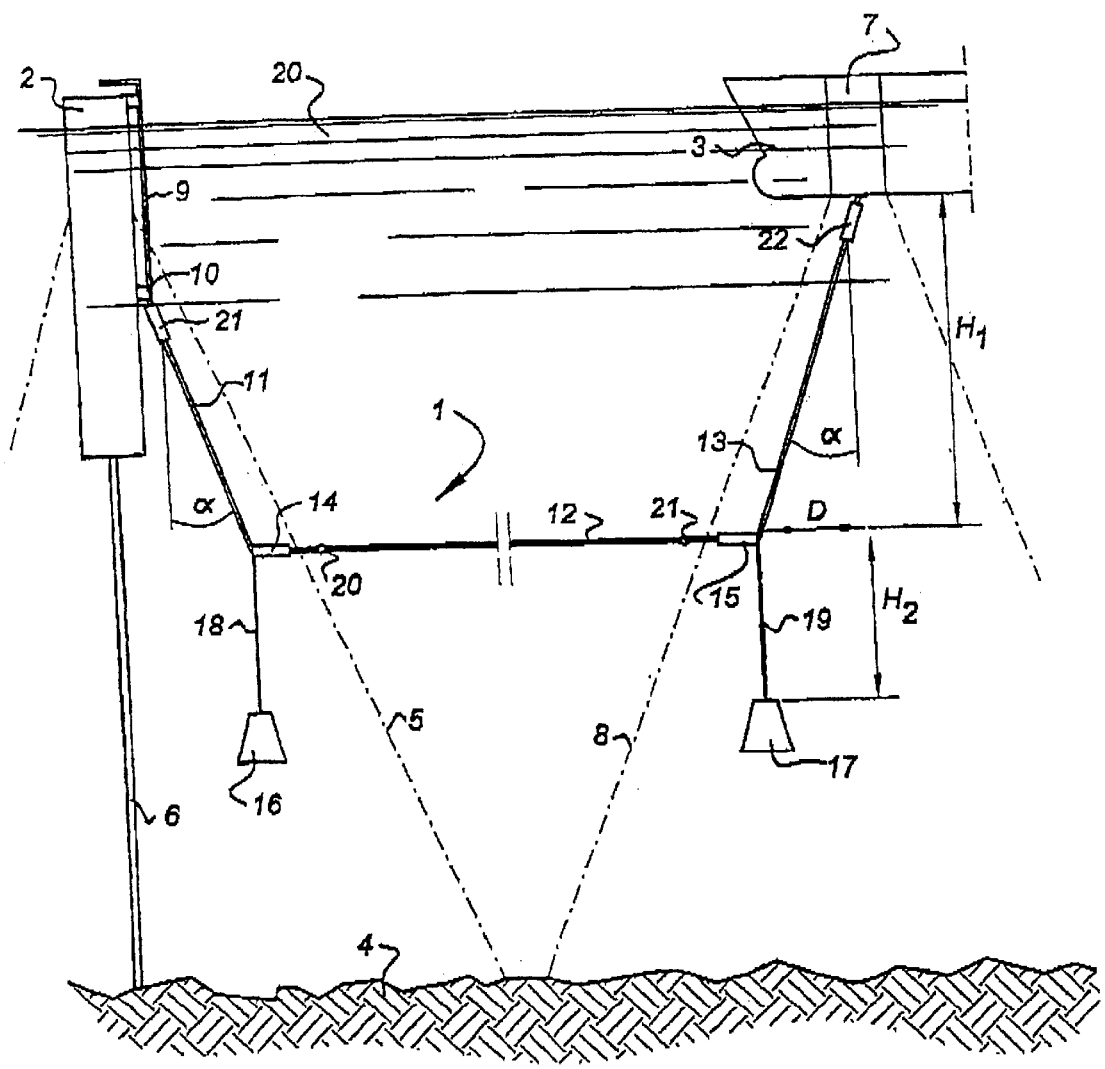
FIG. 1 shows a side view of the transfer system according to a first embodiment of the present invention.

FIG. 1 shows a mid-depth transfer system 1 according to the present invention connecting a spar buoy 2 to a floating production storage and offloading (FPSO) vessel 3.

The spar buoy 2 is anchored to the seabed 4 via anchor lines 5. One or more risers 6 connect the spar buoy to a subsea hydrocarbon well. The vessel 3 comprises a geostationary turret 7. The turret 7 is via chain table, which extends near keel level of the vessel 3, connected to the seabed 4 via mooring lines 8. The vessel 3 can weathervane around the turret 7.

From the production tree at deck level of the spar buoy 2, one or more pipes 9 extend, for instance via a guide 10 at the outer perimeter of the spar buoy, to an inclined duct section 11. The inclined duct section 11 is connected to a horizontal duct section 12 which at its other end is connected to a second inclined duct section 13. The inclined duct section 13 is connected to the turret 7 of the vessel 32. The inclined duct sections 11, 13 are connected to the spar buoy 2 and the vessel 3 respectively via flexible joints 21, 22.

The horizontal duct section 12 is connected to the inclined duct sections 11,13 via pivot joints or flexible joints 14,15. At or near the joints 14,15 tensioning weights 16,17 are attached via cables 18,19. The tensioning force exerted by each weight 16,17 is proportional to sin α, wherein α equals the angle of inclination of the substantial vertical duct sections 11,13. Although it is shown in FIG. 1 that the angles α of the duct sections 11,13 are equal, tis is not necessary and different inclinations may be used when differing weights 16,17 are used. Furthermore, it is not necessary that the duct section 12 is exactly horizontal but it may be offset from the horizontal. The horizontal duct section 12 may be located from a few meters, up to 150 meters or more below sea level 20.

The angle of inclination a may for instance be about 30°. The height H1 between the flexible joints 21,22 and the attachment point of the weights may be fox instance 115 meters. The horizontal distance between the flexible joints 21,22 may be about 2173 meters whereas the length of the horizontal duct section 12 may be about 2000 meters. The length of each inclined duct scion 11, 13 is about 173 meters. The weight of each tensioning weight 16, 17 can be for instance 100 t. The diameter of the ducts 11, 12 and 13 may be for hard pipe for instance 0,5 meter.

As the dynamic motions of floating vessels during storms can be large, the vertical motion transferred to duct 12 by way of duct 11 or 13 may cause unacceptable bending stresses near the ends of duct 12. To alleviate this bending, an additional articulated pivot or flex joint 20, 21 may be installed perhaps 10 to 100 m from the flexible joints 14, 15.

Figure 2:
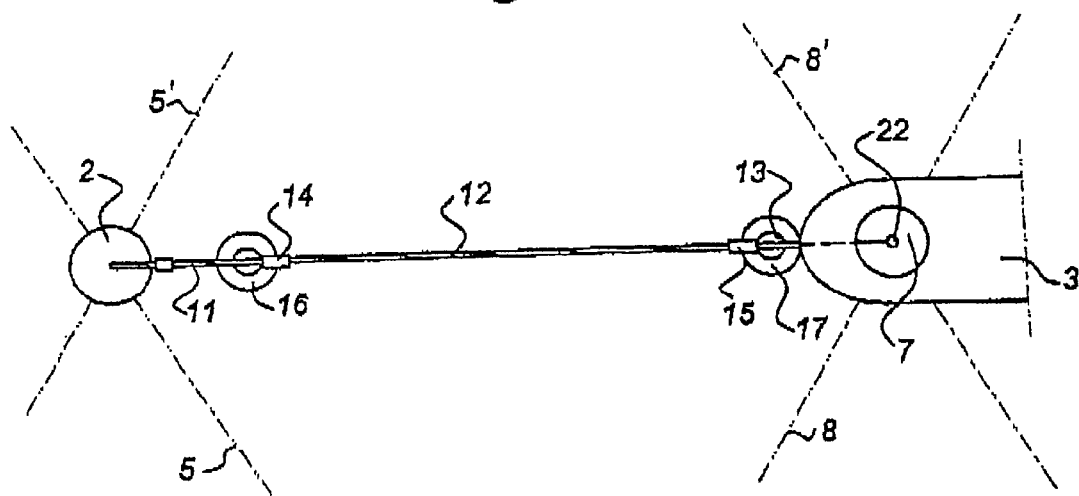
FIG. 2 shows a top view of the system of FIG. 1 in the absence of a sideways current.

As shown in FIG. 2, in the absence of sideways current all duct sections 11, 12 and 13 will extend along a substantially straight line.

Figure 3:
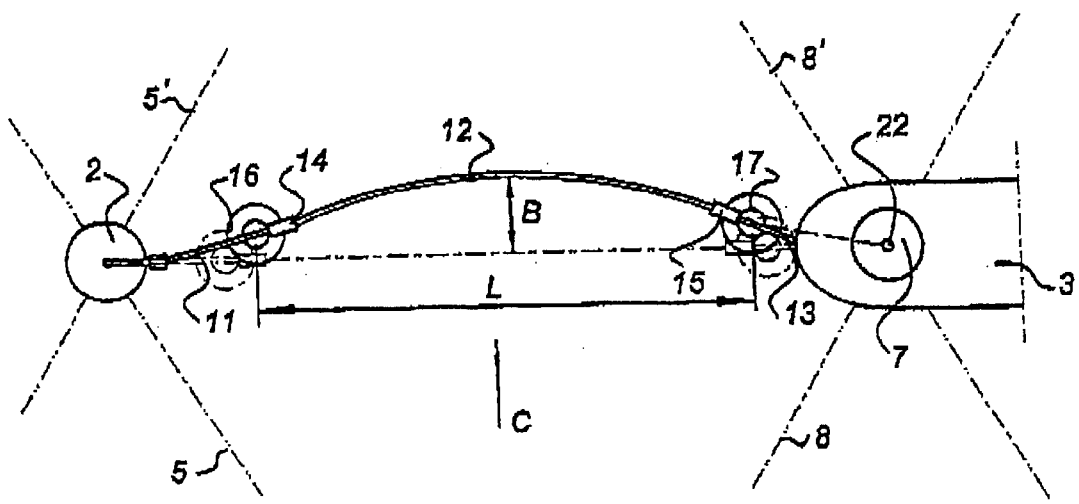
FIG. 3 shows a top view of the system of FIG. 1 wherein the horizontal duct section is displaced by a sideways current and FIG. 4 shows schematically the side view of a fiber transfer system according to a further embodiment of the present invention.

Due to a sideways current in the direction of the arrow c, as shown in FIG. 3, the horizontal duct section 12 is somewhat displaced and the distance L between the two tensioning weights 16, 17 is decreased compared to the distance L in the absence of a current, which has been indicated with the dashed lines in FIG. 3. Hereby the horizontal duct section 12 will assume a curved or bend shape. The distance L of the section 12 can for instance be between 1000 and 10.000 meters.

As the tensioning weights 16, 17 exert a tensional force on the horizontal duct section 12, the amount of buckling remains limited. Furthermore, the excursion of the horizontal duct section from its straight position will be limited due to the additional tensional restoring force of the tensioning weights 16, 17 when they are placed in their offset position, as shown in FIG. 3. For the distance L of 2173 meters, the amount of sideways deflection B may be about 300 meters at a sideways current of about 1 m/s. In this case the angle of inclination a will increase from 30° to about 35°. The horizontal tensioning forces in the horizontal duct section 12 amount to about 52 tons whereas the vertically directed component of the tensioning weight 16, 17 amounts to about 31 t.

Figure 4:
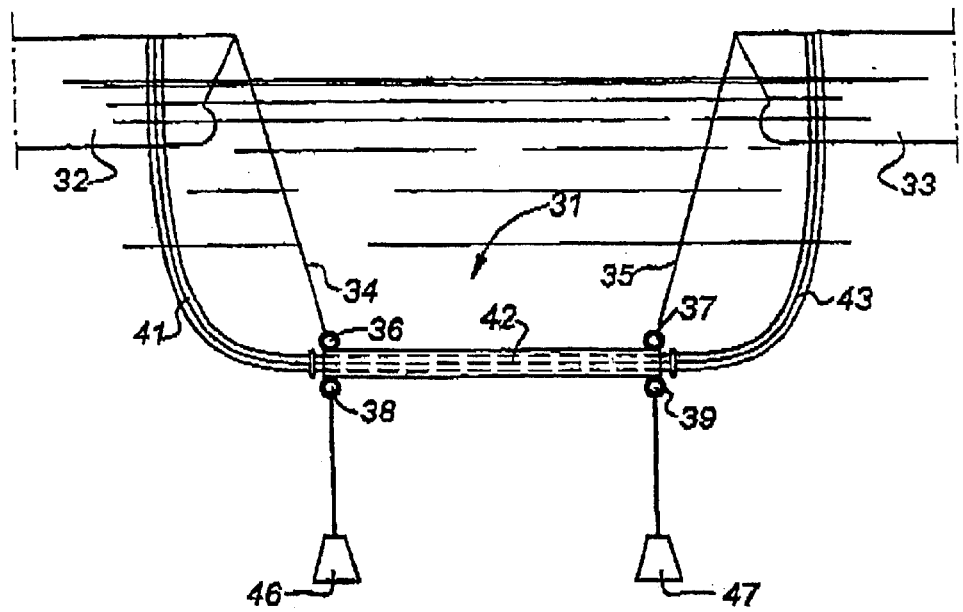

FIG. 4 shows a further embodiment of the invention wherein the mid-depth transfer system is referred to by 31 and connects two vessels 32 and 33. From the production tree at deck level of vessel 32 one or more pipes [39] extend to a duct section 41. This duct section 41 is connected to a horizontal duct section 42 comprising a long multiple pipe bundle which can either be rigid or flexible. This horizontal duct section 42 is at its other end connected to a second duct section 43 being connected to vessel 33. From vessel 32 and 433 tension members 34, 35 extend to a connection 36, 37 on the third duct section. These tension members can comprise a chain cable or any other tension member known in the art. The long multiple pipe bundle 42 is provided with further connections 38, 39 to which weights 46 and 47 are connected.

Each of the first and second duct sections is no longer tensioned as in the embodiments according to FIGS. 1–3 wherein the tension member is integrated in the first and second duct section. Because of that the first and second duct section will have the shape as shown, i.e. comprising a first substantially vertical part and a third substantial horizontal part connecting to the third duct section. Inbetween is a transisitional part.

The person skilled in the art will understand that al alternatives given with regard to the embodiment discussed relating to FIGS. 1–3 can be introduced in the embodiment of FIG. 4 and vice versa. Furthermore further changes of the structure discussed above are possible being obvious for the person skilled in the art without leaving the scope of protection which is conferred by the appended claims.

Figure 5:
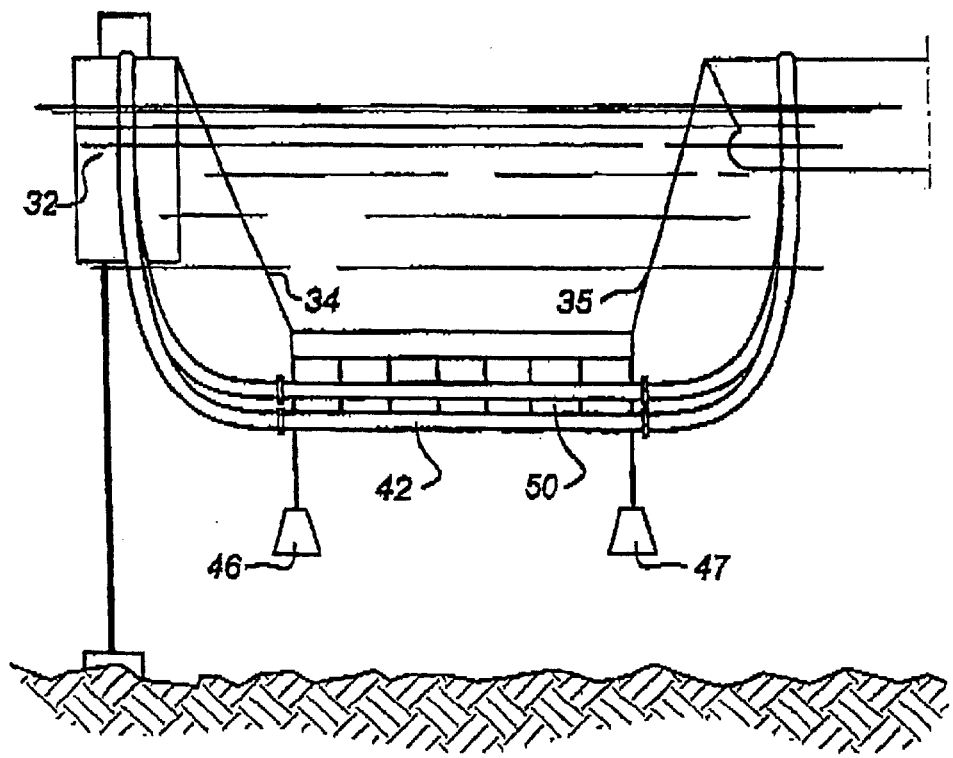
FIG. 5 shows an embodiment wherein the horizontal duct section is connected to a floatation member.

In the embodiment of FIG. 5, the horizontal, third member comprises an elongated buoyancy element 50, with several chambers which is tensioned by tension members 34, 35 and weights 46, 47. The buoyancy element 50 serves as a structional support for the ducts 42.

Figure 6:
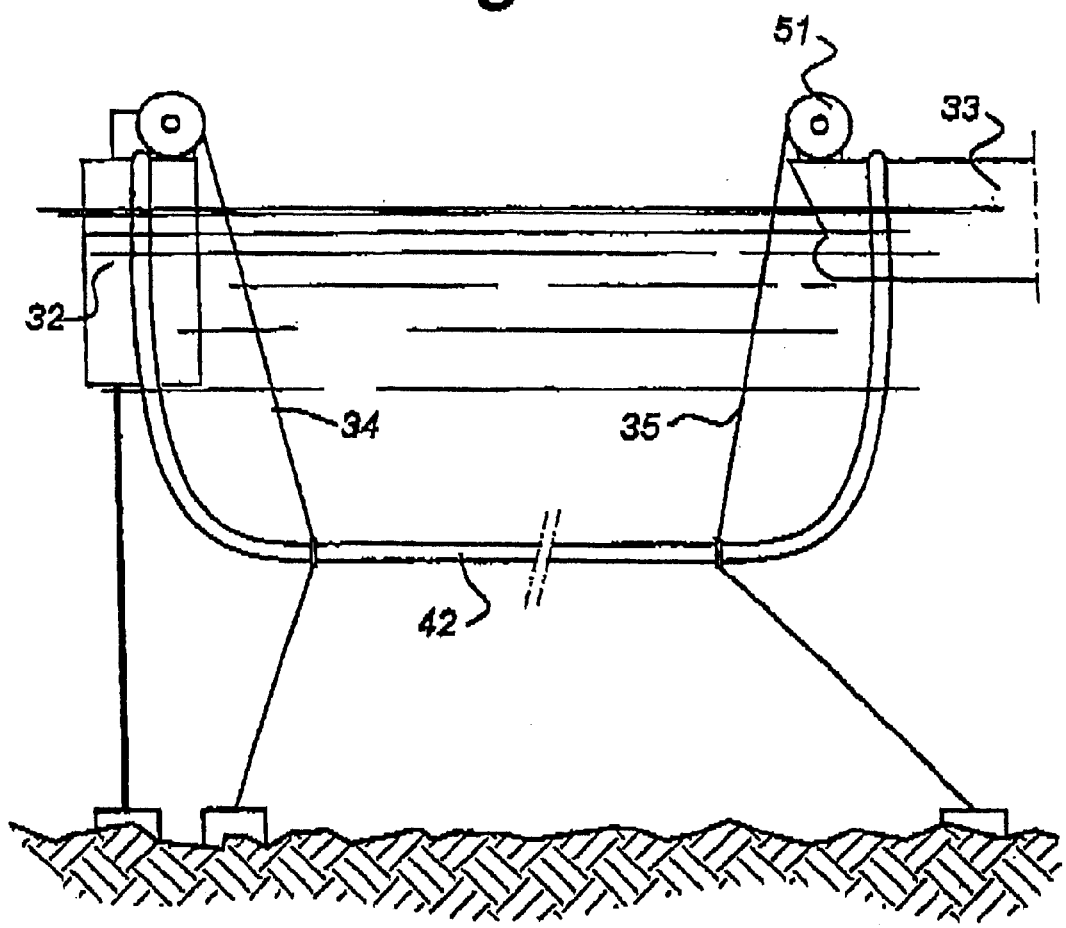
FIG. 6 shows an alternative tensioning construction.

In the embodiment of FIG. 6 the tension members 34, 35 comprise polyester cables, attached to the seabed. Cable 35 is connected to a winch 51 and the vessel 33.

What is claimed is:

1. A transfer system for transfer of fluids from a first fixed or floating structure to a second floating structure, the transfer system comprising:

a first duct section connected to the first structure;

a second duct section connected to the second structure;

a third duct section comprising a substantially horizontal, submerged member interconnecting the first and second duct sections, wherein at least one of the first and second duct sections is oriented in a substantially vertical direction and inclined at an angle with respect to the vertical; and a tensioning element connected at or near ends of the horizontal member for providing a downward tensioning force on the substantially horizontal member.

2. The transfer system according to claim 1, wherein the tensioning element comprises a tensioning weight connected at or near the connecting point of the inclined duct section and the substantially horizontal third duct section for providing the tensioning force on the third duct section.

3. The transfer system according to claim 1, wherein both the first and second duct sections are inclined with respect to the vertical and the tensioning element comprises a tensioning weight provided at or near each connecting point of the first and second duct sections with the third duct section.

4. The transfer system according to claim 1, further comprising articulation joints for attaching the first and second duct sections to the third duct section.

5. The transfer system according to claim 1, further comprising articulation joints for attaching the first and second duct sections to the respective structures.

6. The transfer system according to claim 1, wherein all of the duct sections comprise hard pipe.

7. The transfer system according to claim 1, wherein the third duct section comprises at least two parallel sections.

8. The transfer system according to claim 1, further comprising means for adjusting the downward tensioning force of the tensioning element by weight or buoyancy.

9. The transfer system according to claim 1, further comprising means for providing the third duct section with buoyancy.

10. The transfer system according to claim 1, wherein the third duct section comprises a hard pipe duct section having a flexible pipe section or articulations therein to reduce bending.

11. A transfer system for transfer of fluids from a first fixed or floating structure to a second floating structure, the transfer system comprising:

a first duct section connected to the first structure;

a second duct section connected to the second structure;

a third duct section comprising a substantially horizontal, submerged member interconnecting the first and second duct sections;

a first support member interconnecting the first structure and a first end of the third duct section;

a second support member interconnecting the second structure and a second end of the third duct section, wherein at least one of the first and second support members is oriented in a substantially vertical direction and inclined at an angle with respect to the vertical; and a tensioning element connected near ends of the horizontal member for providing a downward tensioning force on the substantially horizontal member.

12. The transfer system according to claim 11, wherein the support members comprise cables.

13. The transfer system according to claim 12, wherein at least one of the first and second duct sections comprises a first substantially vertical part, a second transitional part and a third substantially horizontal part.

14. The transfer system according to claim 12, wherein both cables are inclined with respect to the vertical and the tensioning element comprises a tensioning weight provided at or near each connecting point of each cable with the third duct section.

15. The transfer system according to claim 12, further comprising articulation joints for attaching the first and second duct sections and the cables to the third duct sections.

16. The transfer system according to claim 11, further comprising articulation joints for attaching the first and second duct sections to the respective structures.

17. The transfer system according to claim 11, wherein all of the duct sections comprise hard pipe.

18. The transfer system according to claim 11, wherein the third duct section comprises at least two parallel sections.

19. The transfer system according to claim 11, further comprising means for adjusting the downward tensioning force of the tensioning element by weight or buoyancy.

20. The transfer system according to claim 11, further comprising means for providing the third duct section with buoyancy.

21. The transfer system according to claim 11, wherein the third duct section comprises a hard pipe duct section having a flexible pipe section or articulations therein to reduce bending.

* * * * *